(12) United States Patent
Knobloch

(10) Patent No.: US 10,375,874 B2
(45) Date of Patent: Aug. 13, 2019

(54) DUAL RATE SWEEP LOAD ON FIELD CULTIVATOR SHANK ASSEMBLY

(71) Applicant: CNH Industrial America LLC, New Holland, PA (US)

(72) Inventor: Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 65 days.

(21) Appl. No.: 15/673,745

(22) Filed: Aug. 10, 2017

(65) Prior Publication Data

US 2019/0045700 A1 Feb. 14, 2019

(51) Int. Cl.
*A01B 61/04* (2006.01)
*A01B 49/02* (2006.01)
*A01B 3/24* (2006.01)

(52) U.S. Cl.
CPC .............. *A01B 61/046* (2013.01); *A01B 3/24* (2013.01); *A01B 49/027* (2013.01)

(58) Field of Classification Search
CPC ........ A01B 61/046; A01B 3/24; A01B 49/027
See application file for complete search history.

(56) References Cited

U.S. PATENT DOCUMENTS

| | | | |
|---|---|---|---|
| 3,480,086 A | * | 11/1969 | Groenke ................. A01B 35/12 172/705 |
| 3,529,673 A | * | 9/1970 | Morris .................. A01B 61/046 172/266 |
| 3,599,727 A | | 8/1971 | Gates |
| 3,700,038 A | | 10/1972 | Essex |
| 3,923,103 A | * | 12/1975 | Davis ..................... A01B 39/26 171/10 |
| 3,981,367 A | | 9/1976 | Mydels |
| 3,991,831 A | | 11/1976 | Foster |
| 4,078,615 A | | 3/1978 | Kelley |
| 4,136,745 A | | 1/1979 | Van Der Lely |
| 4,149,475 A | | 4/1979 | Bailey et al. |
| 4,261,423 A | | 4/1981 | Williamson |
| 4,281,719 A | | 8/1981 | Hake et al. |
| 4,502,548 A | | 3/1985 | Griffin |

(Continued)

FOREIGN PATENT DOCUMENTS

GB 873241 7/1961

OTHER PUBLICATIONS

2000 Series Chisel Plows, dated May 2, 2013, http://www.sunflowermfg.com/assets/uploads/sunflower-full-product-line-brochure.pdf.

*Primary Examiner* — Tara Mayo-Pinnock
(74) *Attorney, Agent, or Firm* — Rebecca L. Henkel; Rickard K. DeMille

(57) ABSTRACT

An agricultural implement including a frame configured to be towed behind a vehicle and a plurality of shank assemblies connected to the frame and configured for engaging a soil. Each shank assembly includes a shank mount configured to mount to the frame, a coupling arm pivotally connected to the shank mount and extending rearwardly therefrom, and a shank connected to the coupling arm at an end and extending downwardly therefrom to a tool-supporting end. Each shank assembly also includes a ground-engaging tool connected to the tool-supporting end of the shank and a variable rate spring positioned in between the shank mount and the coupling arm and configured for providing a variable ground-engaging tool load.

18 Claims, 6 Drawing Sheets

(56) References Cited

U.S. PATENT DOCUMENTS

| | | |
|---|---|---|
| 5,394,946 A | 3/1995 | Clifton et al. |
| 5,431,232 A * | 7/1995 | Kirsch ................. A01B 49/027 111/130 |
| 5,727,638 A | 3/1998 | Wodrich et al. |
| 6,250,398 B1 | 6/2001 | Zaun et al. |
| 6,684,961 B2 | 2/2004 | Ruckle et al. |
| 8,985,234 B2 | 3/2015 | Gadzella et al. |

* cited by examiner

DUAL RATE SWEEP LOAD ON FIELD CULTIVATOR SHANK ASSEMBLY

BACKGROUND OF THE INVENTION

1. Field of the Invention

The present invention relates to agricultural implements, and, more particularly, to agricultural tillage implements with shank assemblies.

2. Description of the Related Art

Farmers utilize a wide variety of tillage implements to prepare soil for planting. Tillage implements prepare the soil by way of mechanical agitation of numerous types, such as digging, stirring, and overturning. Examples of tillage include plowing (overturning with moldboards or chiseling with chisel shanks), disking, harrowing, sweeping, and cultivating with cultivator shanks. Tillage implements are often classified into two types: vertical or horizontal tillage. Generally, vertical tillage is performed with implements such as colters or spider wheels. Horizontal tillage, on the other hand, is performed with implements such as sweeps. The employment of vertical and/or horizontal tillage depends upon various aspects of a given situation including soil conditions, equipment, crops to be planted, etc.

Some tillage implements may include two or more sections coupled together to perform multiple functions as they are pulled through fields by an agricultural vehicle. For example, a field cultivator is capable of simultaneously tilling soil and leveling the tilled soil in preparation for planting. Field cultivators convert compacted soil into a level seedbed with a consistent depth for providing optimal conditions for planting of a crop. Residual crop material, weeds, or other undesired plants disposed on top of the soil are destroyed and worked into the soil.

A typical field cultivator generally includes a frame that carries a number of ground-engaging tillage tools for working the soil. For example, shank assemblies with sweeps may be incorporated to create a level seedbed to facilitate optimal seed growth. Some field cultivators may include rear auxiliary tools to perform various secondary tasks for finishing the soil. For example, a rear auxiliary tool may be in the form of a spike tooth harrow, spring tooth harrow, rolling (aka. crumbler) basket, etc. The crumbler basket has a reel with numerous blades for breaking up dirt and sod clods into smaller sizes, chopping up the remaining debris on the top of the soil, smoothing out ridges, and slightly packing the field.

A shank assembly typically includes a spring to provide an initial preset force in order to minimize any movement of the shank as it is used in the field. If the load force acting against the shank overcomes the spring force, for example the shank encounters a rock or hard soil, the shank may pivot rearwardly, i.e., trip, to clear the obstruction. The horizontal load force which induces tripping is commonly referred to as the trip force. Thereby, the trip load may be measured as the horizontal force that acts against the sweep located at the bottom end of the shank. In some circumstances, a higher trip force may result in greater stabilization of the agricultural implement and a more level seedbed. For example, it may be advantageous to have a higher trip force when operating at greater speeds or in harder soil conditions. However, the greater trip force may not be desirable in other conditions, such as in soft soil conditions, as it could lead to increased wear on the agricultural implement.

A farmer may wish to operate a field cultivator in numerous different terrains and field conditions, including various soil types and soil conditions. To augment farming efficiency, a farmer may want to cultivate a greater number of acres in the same amount of time with one field cultivator. Thereby, to increase productivity, a shank assembly of a field cultivator may need to be operated in multiple field types and conditions. Some shank assemblies may not be capable of operating effectively in several different terrains and/or field conditions. For instance, in a harder soil condition, a shank assembly with a lessor spring rate may cause the depth of the field cultivator to undesirably vary. Thereby, a farmer may not be able to use one type of field cultivator, which has a particular set of shank assemblies, for multiple fields.

What is needed in the art is a tillage implement that can efficiently and aptly accommodate different terrain and field conditions.

SUMMARY OF THE INVENTION

The present invention provides a shank assembly that has a variable rate spring that varies the ground-engaging tool load provided to the ground-engaging tool. Thereby, the shank assembly of the present invention may accommodate numerous, differing types of terrain changes, field types, and field conditions.

The invention in one form is directed to an agricultural implement including a frame configured to be towed behind a vehicle and a plurality of shank assemblies connected to the frame and configured for engaging a soil. Each shank assembly includes a shank mount configured to mount to the frame, a coupling arm pivotally connected to the shank mount and extending rearwardly therefrom, and a shank connected to the coupling arm at an end and extending downwardly therefrom to a tool-supporting end. Each shank assembly also includes a ground-engaging tool connected to the tool-supporting end of the shank and a variable rate spring positioned in between the shank mount and the coupling arm and configured for providing a variable ground-engaging tool load.

The invention in another form is directed to a shank assembly configured for engaging a soil. The shank assembly includes a shank mount, a coupling arm pivotally connected to the shank mount and extending rearwardly therefrom, a shank connected to the coupling arm at an end and extending downwardly therefrom to a tool-supporting end. The shank assembly also includes a ground-engaging tool connected to the tool-supporting end of the shank and a variable rate spring positioned in between the shank mount and the coupling arm and configured for providing a variable ground-engaging tool load.

An advantage of the present invention is that the shank assembly can accommodate different types of terrains, field types, and field conditions.

Another advantage of the present invention is that manufacturing costs and costs incurred by the farmer may be decreased as a single type of shank assembly can be produced and used for multiple fields instead of using two or more different types of shank assemblies.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

Figure 1:
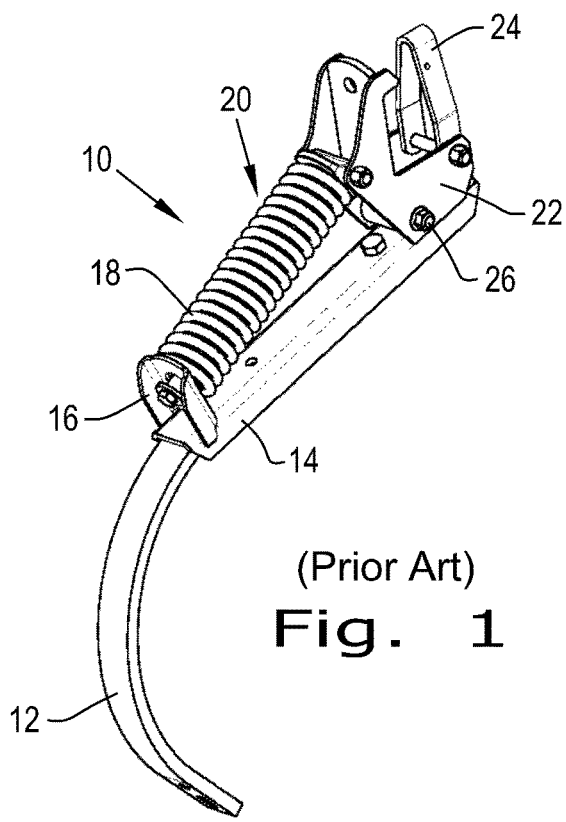
FIG. 1 is a perspective view of a shank assembly known in the art.
Figure 2:
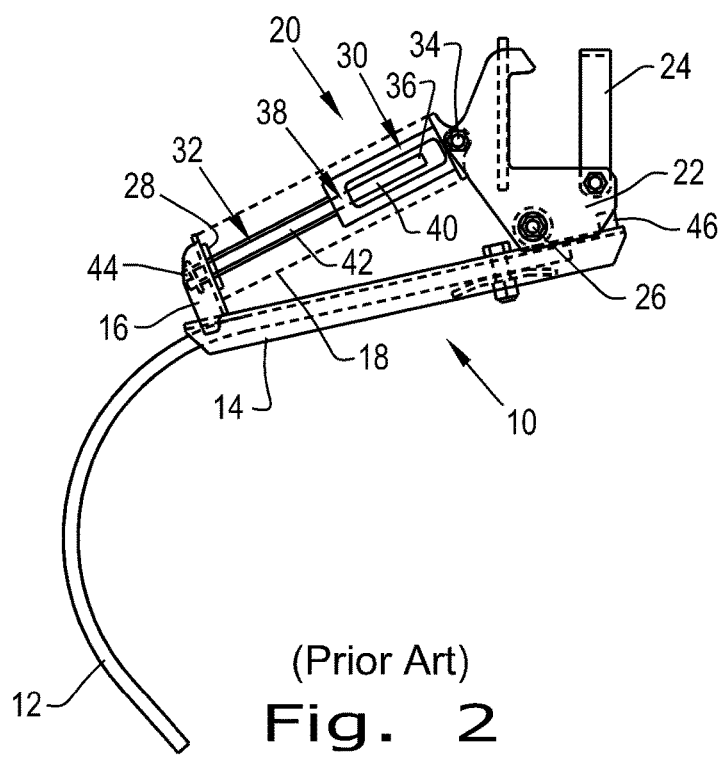
FIG. 2 is a side view of the shank assembly as shown in FIG. 1.

Referring now to the drawings, and more particularly to FIGS. 1-2, there is shown a known shank assembly 10 which generally includes a shank 12, a shank channel guard 14, a spring channel 16, a compression spring 18, a spring retaining assembly 20, a shank mount 22, and a bracket 24. The shank assembly 10 may be incorporated in a field cultivator such as the TIGER-MATE™ 200 from Case IH, LLC.

The shank 12 may be in the form a known shank that is affixed to the shank channel guard 14 and has a tool-supporting end for attaching a ground engaging tool such as a sweep. The sweep may be fixed the end of the shank my known fasteners. The shank 12 may have a curved shaped, which may be approximately the shape of a hook or "C". The shank 12 may be composed of a semi-rigid material which slightly flexes as the implement is moved across a field. The shank 12 may be composed of a metal or a metal alloy, for example, the shank 12 may be composed of spring steel.

The shank channel guard 14 may pivotally connect to the shank mount 22 at a pivot location 26 via a known fastener. The shank channel guard 14 may extend substantially horizontally and outwardly from the bottom of the shank mount 22. The other end of the shank channel guard 14 may couple to the shank 12. The shank channel guard 14 may be of a rectangular channel, and may be composed of a metal or metal alloy. The spring channel 16 may include a hole disposed through its middle section (not shown). The spring channel 16 may also include a hardened washer 28 which acts as a spring keeper for contacting the compression spring 18. The spring channel 16 may be fixedly attached (e.g. welded) to the shank channel guard 14. The spring channel 16 may be composed of a metal or metal alloy.

The compression spring 18 may be in the form of a conventional helical coil spring. The spring retaining assembly 20 may include a pivot casting 30 and a retaining bolt assembly 32. The pivot casting 30 may have a top portion with a horizontal bore or hole disposed therein for pivotally connecting to the shank mount 22 at a pivot location 34. The middle portion of the pivot casting 30 may have a cylindrical, ellipsoidal, or rectangular groove or slot 36. The end portion of the pivot casting 30 may be in the form of a circular base member with a vertical bore or hole 38 disposed therethrough. The pivot casting 30 may be composed of a known metal or metal alloy. The retaining bolt assembly 32 may include a bolt 40, a heat-treated tube 42 surrounding a portion of the bolt 40, and a washer 44. The retaining bolt 40 may extend through the hole in the spring channel 16, through the center of the compression spring 18, and through the hole 38 at the bottom of the pivot casting 30. Thereby, the bolt may help to keep the compression spring 18 from bending as the compression spring 18 compresses.

The shank mount 22 may be in the form of a mounting bracket that couples with the bracket 24 in order to securely mount onto a structural member of the frame of the agricultural implement. The shank mount 22 may include a shank stop 46 welded in between the side plates and near the bottom of the shank mount 22. The shank mount 22 may be composed of a metal or metal alloy.

Figure 3:
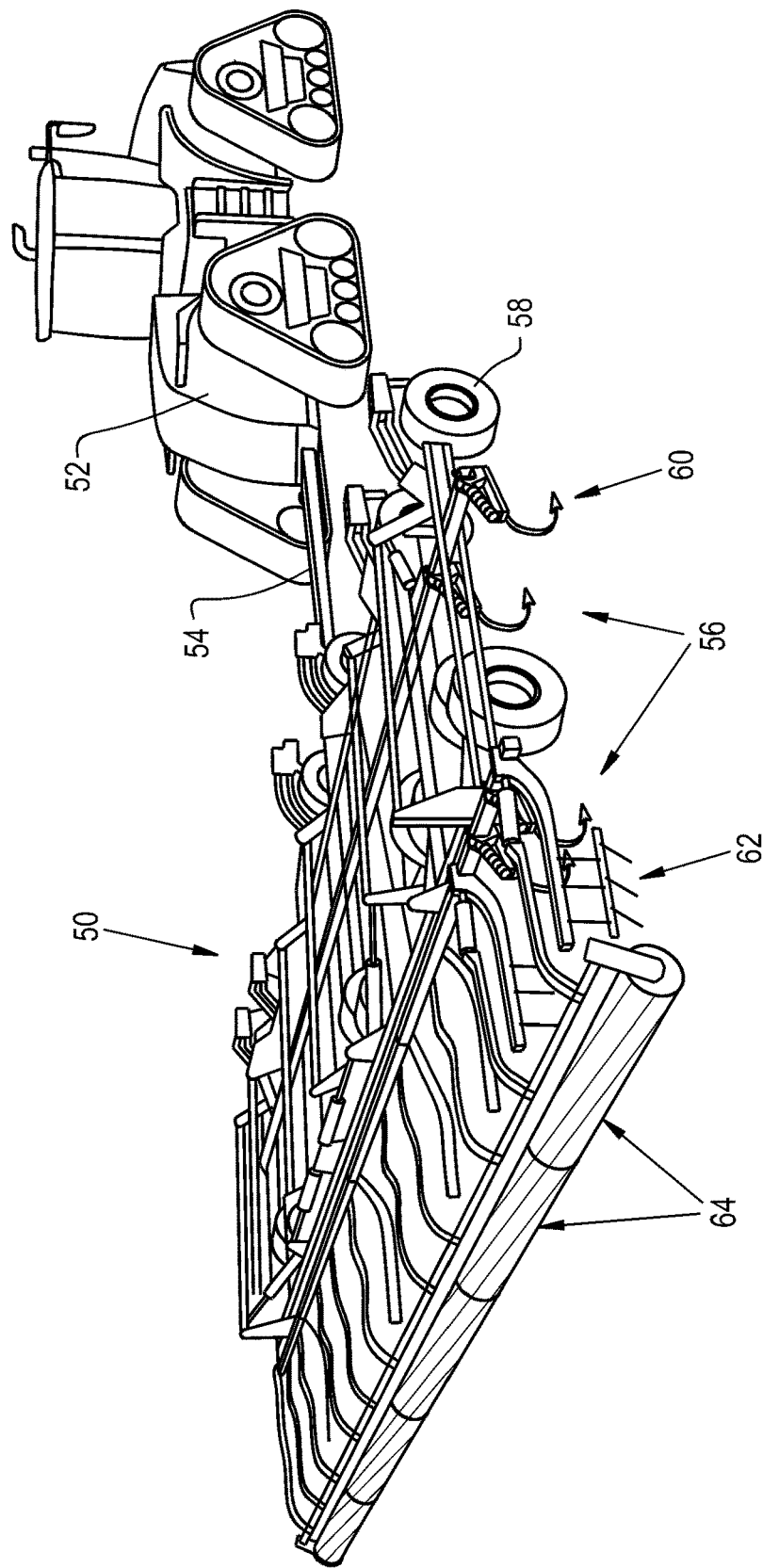
FIG. 3 is a perspective view of a tillage implement according to the present invention.

Referring now to FIG. 3, there is shown an agricultural implement 50 that is being pulled by an agricultural vehicle 52, such as a tractor or other work vehicle, through a field. The agricultural implement 50 may be in the form of multi-section field implement such as a field cultivator or other tillage implement. The agricultural implement 50 generally includes a frame 54 and various ground engaging tools 56 mounted to the frame 54.

The frame 54 may be supported by wheels 58 and towed by the tractor 52. The frame 54 may be a single body frame or it may be a multi-section frame which has wing sections that fold upwardly during transport. Accordingly, the frame 54 may support hydraulic and electrical systems which can adjust down pressure and/or fold and unfold the wing sections. Generally, the agricultural vehicle 52 carries the hydraulic fluid source. The hydraulic and electrical systems of the agricultural implement 50 may be controlled by a user via data transmitted to the agricultural vehicle 52 by an ISOBUS connection.

The agricultural implement 50 may include numerous ground engaging tools 56 such as a ganged disk harrow, multiple shank assemblies 60, a spring or spike tooth harrow 62, and/or roller baskets 64. The roller baskets 64 may include springs or hydraulic cylinders to individually control the down force applied by the roller baskets 64. It should be appreciated that the agricultural implement 50 may include various configurations of ground engaging tools 56 to create a level seedbed, turnover the soil, and smooth the surface of the soil in order to facilitate optimal seed growth.

Referring now to FIGS. 4-9, there is shown the shank assembly 60 according to the present invention. Each shank assembly 60 is connected to the frame 54 and is configured to engage the soil. Each shank assembly 60 generally includes a shank mount 66 mounted to the frame 54, a coupling arm 68, a shank 70, a ground-engaging tool 72 connected to the shank 70, and a variable rate spring 74. The shank assembly 60 is configured to create a level seedbed for subsequent planting.

Figure 6:
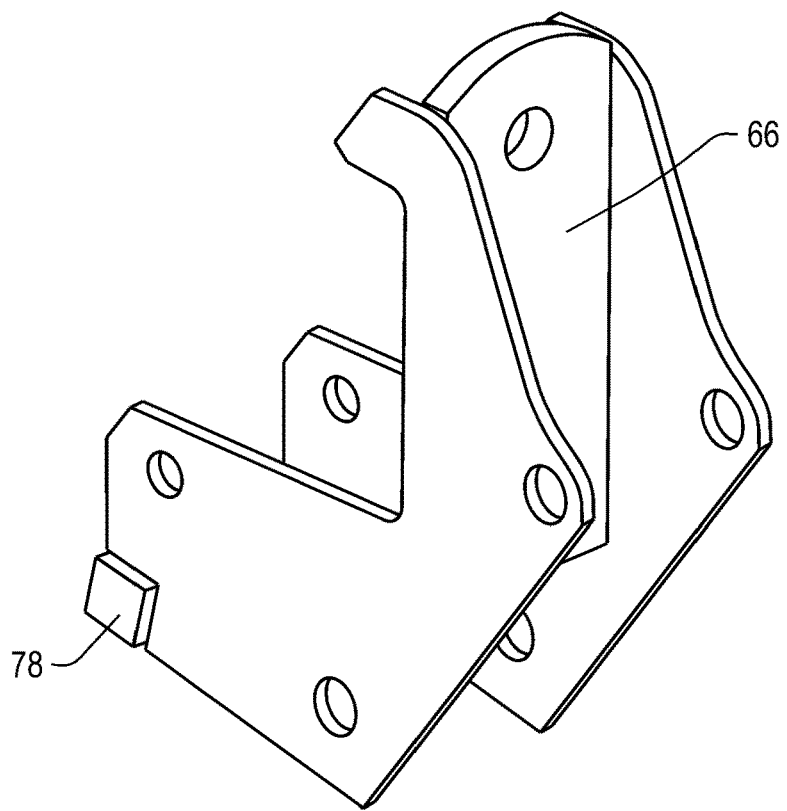
FIG. 6 is a perspective view illustrating a shank mount according to the present invention.

The shank mount 66 may be in the form of a mounting bracket with plates on each side that couple with a bracket 76 in order to securely mount onto the frame 54. The shank mount 66 may include a shank stop 78 that is affixed (e.g. welded) on the bottom side of the plates of the shank mount 66 (FIG. 6). The shank stop 78 may extend to be approximately flush with the side plates of the shank mount 66. The shank mount 66 and the shank stop 78 may be composed of a metal or metal alloy.

Figure 5A:
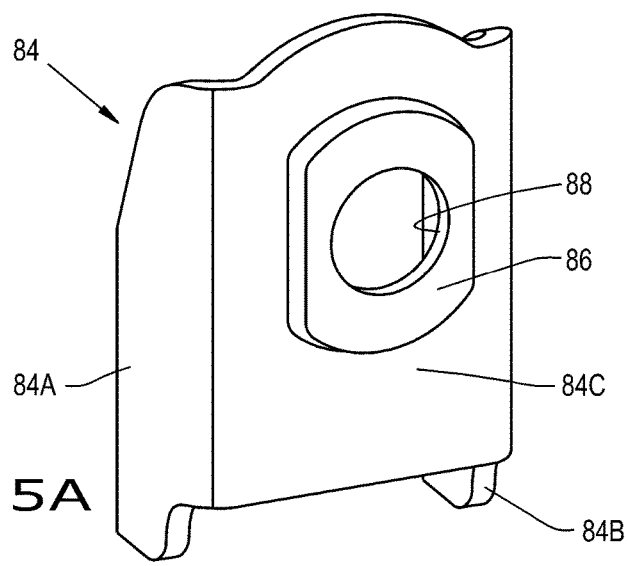
FIGS. 5A-5C illustrate a spring channel according to the present invention.
Figure 5B:
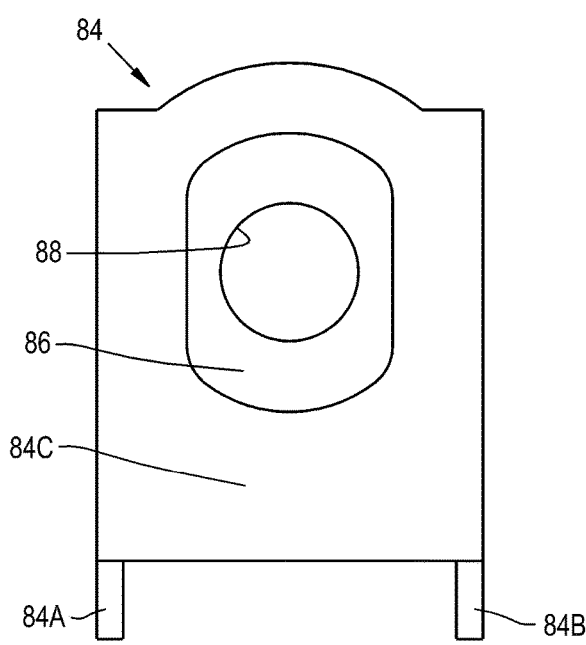
Figure 5C:
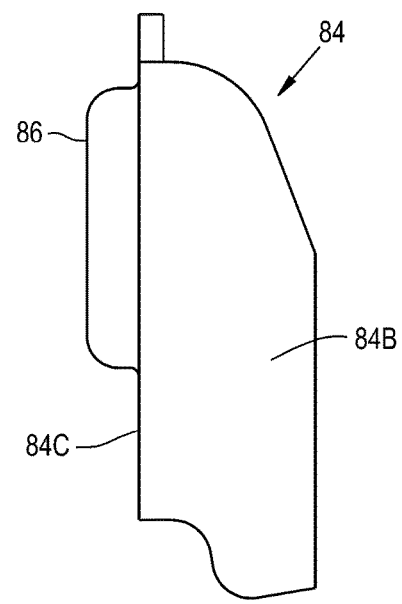

The coupling arm 68 may be pivotally connected to the shank mount 66 at a pivot location 80 by a known fastener, and the coupling arm 68 may extend rearwardly therefrom. The coupling arm 68 may include a shank channel guard 82 and a spring channel 84. The shank channel guard 82 may be pivotally connected to the shank mount 66 and may extend substantially horizontally and rearwardly therefrom. The spring channel 84 may be fixedly attached to the shank channel guard 82 by known fasteners or welding. The spring channel 84 may have two sidewalls 84A, 84B and a center portion 84C interconnecting the two sidewalls 84A, 84B (FIGS. 5A-5C). The middle portion 84C may have a protruding spring keeper section 86 that is configured for contacting an end of the variable rate spring 74. The spring keeper section 86 may protrude outwardly from the surface of the middle portion 84C, and the spring keeper section 86 may be stamped out such that the spring channel 84 is a monolithic member. The spring keeper section 86 may include a through-hole 88. The shank channel guard 82 and the spring channel 84 may be composed of any suitable metal or metal alloy.

The shank 70 may be connected to the coupling arm 68 at a top end, and the shank 70 may extend downwardly therefrom to a lower, tool-supporting end. More particularly, the shank 70 may be coupled to the shank channel guard 82 by known fasteners or by a weld. The lower end of the shank 70 may have corresponding through-holes in order to mount the ground engaging tool 72. The shank 70 may be in the form a known shank, and the ground-engaging tool 72 may be in the form of a known sweep 72.

Figure 4:
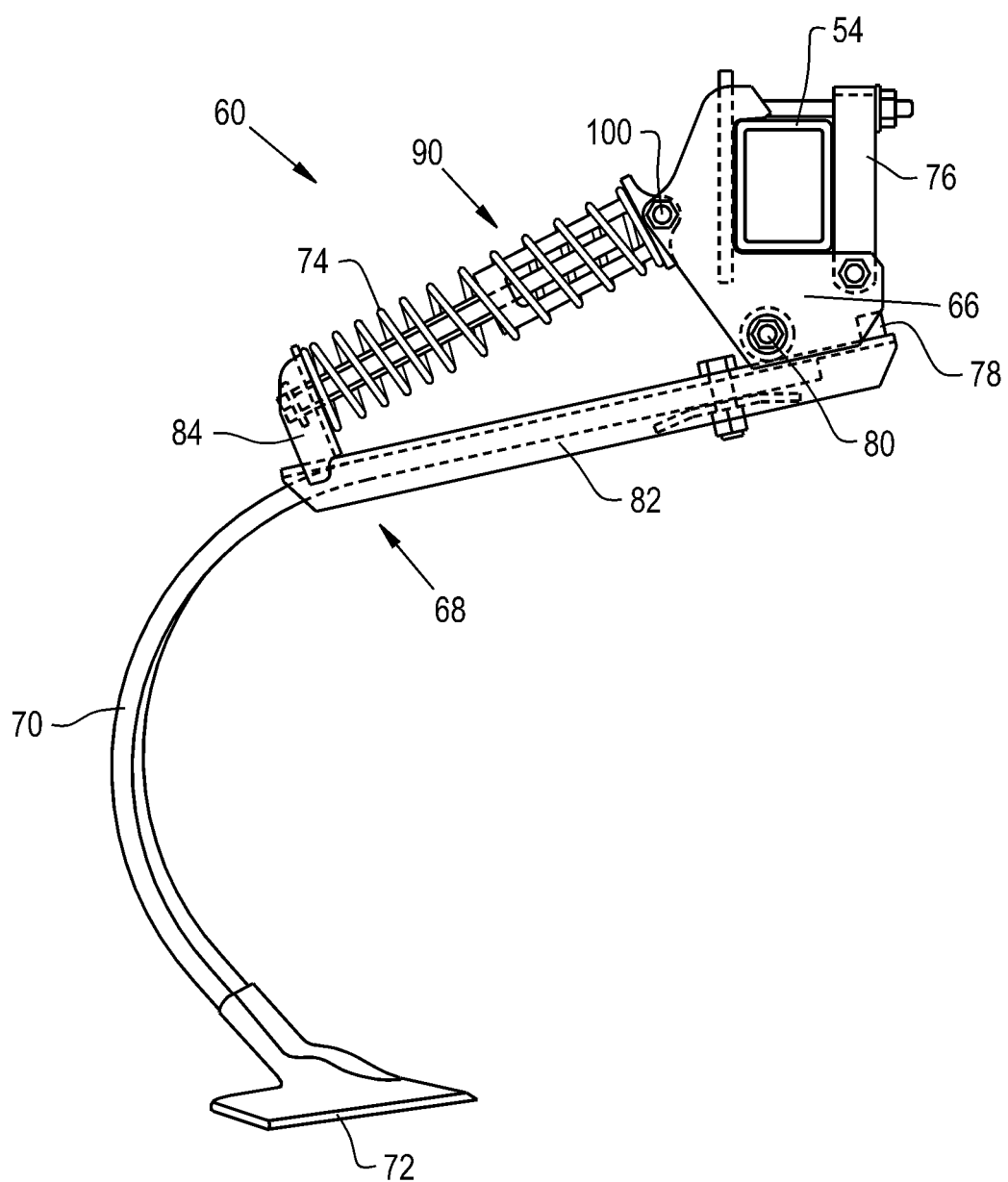
FIG. 4 is a side view of a shank assembly according to the present invention.
Figure 7:
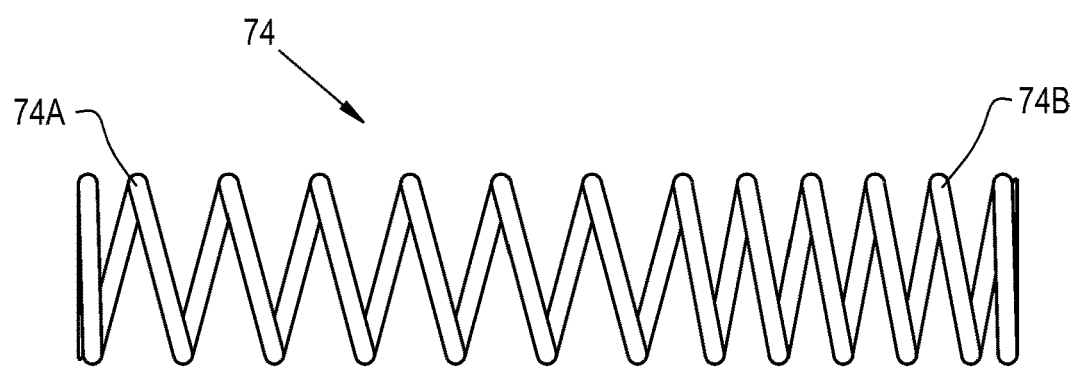
FIG. 7 is a perspective view illustrating a variable rate spring according to the present invention.

Referring now to FIGS. 4 and 7 collectively, there is shown the variable rate spring 74. The variable rate spring 74 may be positioned in between the shank mount 66 and the coupling arm 68 (i.e. the spring channel 84 of the coupling arm 68). The variable rate spring 74 is configured for providing a variable ground-engaging tool load (e.g. sweep load), which leads to differing sweep load curves. For instance, the variable ground-engaging tool load may increase in a hard soil. The variable rate spring 74 may be in the form of a dual rate spring 74 that has two different spring rates, which are respectively associated with two separate ground-engaging tool loads. For example, the dual rate spring 74 may have a section 74A with a wider pitch and another section 74B with a closer pitch, i.e., the spacing between the coils is closer. Thereby, the dual rate spring 74 may initially operate at one spring rate and may subsequently operate at another spring rate upon reaching a desired point of compression. The initial spring rate may be less, for example approximately 220 lbs./in, and the subsequent spring rate may be greater than the initial spring rate, for example approximately 260 lbs./in. For instance, after being compressed to a preload position, the dual rate spring 74 may initially operate at a low spring rate as it enters the soil, and then if there is a greater load acting on the sweep 72 because of hard soil, the dual rate spring 74 may compress further past the preload position and may then operate at a higher spring rate. Hence, the sweep load applied by the dual rate spring may vary to accommodate soft and hard soil conditions as the implement is towed across a field. Thereby, the shank assembly 70 may accommodate multiple field types and conditions because the shank assembly 70 may vary the sweep load.

Figure 8A:
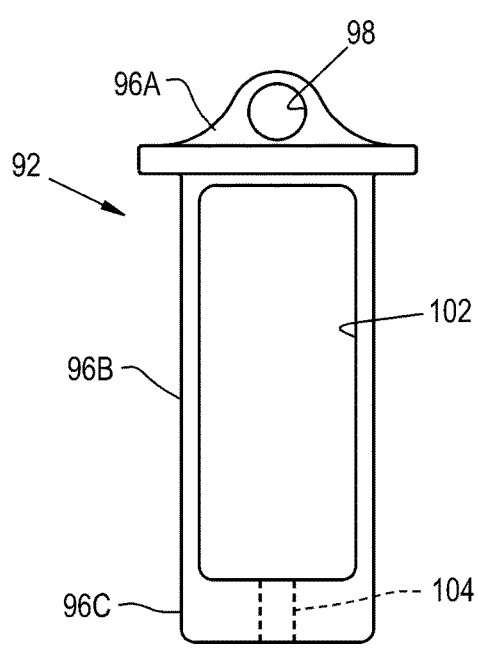
FIGS. 8A-8B illustrate a spring pivot casting according to the present invention.
Figure 8B:
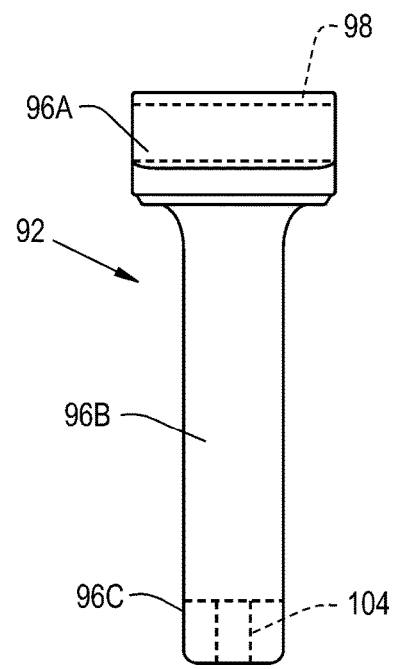
Figure 9:
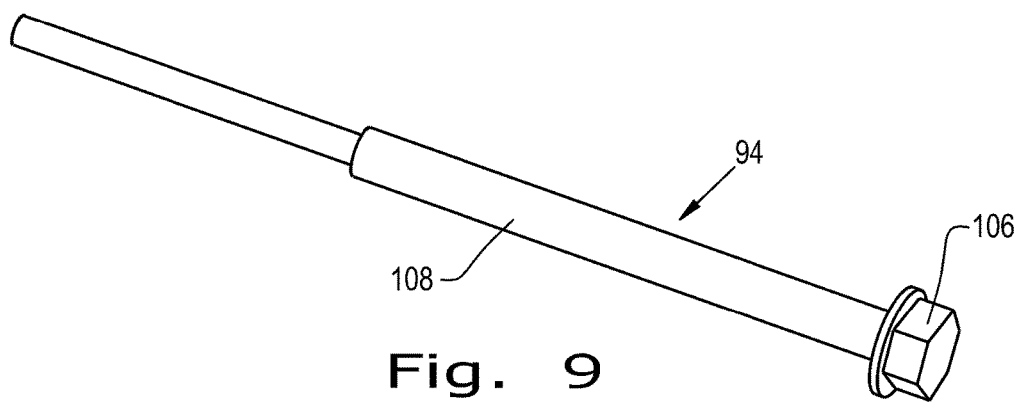
FIG. 9 is a perspective view of a spring retaining bolt according to the present invention.

Referring now to FIGS. 4 and 8-9 collectively, there is shown a spring retaining assembly 90. The spring retaining assembly 90 may include a pivot casting 92 and a retaining bolt 94 associated with the pivot casting 92. The spring retaining assembly 90 is configured to retain the spring 74 such that the spring 74 does not slip or bend during use.

The pivot casting 92 may include a top, middle, and bottom section 96A, 96B, 96C. The top section 96A may include a through-hole 98 disposed therein that is configured for pivotally connecting the pivot casting 92 to the shank mount 66 at a pivot axis 100. The middle section 96B of the pivot casting 92 may include a cutout, groove, or slot 102 such that only the pair of thin lateral sides of the middle section 96B connect the top and bottom sections 96A, 96C. The bottom section 96C may be substantially rectangular in shape and may include a through-hole 104 for slideably receiving the retaining bolt 94. The pivot casting 92 may be composed of any suitable metal or metal alloy.

The retaining bolt 94 may couple to the spring channel 84 and the pivot casting 92. Thereby, the retaining bolt 94 may extend through the through-hole 88 of the spring channel 84, through a center axis of the variable rate spring 74, and through the through-hole 104 of the pivot casting 92. The retaining bolt 94 may include a flange head 106 and a shoulder section 108. It should be appreciated that there is minimal to no load on the retaining bolt 94 during operation of the agricultural implement 50.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural implement, comprising:
a frame configured to be towed behind a vehicle;
a plurality of shank assemblies connected to the frame and configured for engaging a soil, each said shank assembly including:
  a shank mount configured to mount to the frame;
  a coupling arm pivotally connected to the shank mount and extending rearwardly therefrom, the coupling arm including a shank channel guard pivotally connected to the shank mount and extending substantially horizontally and rearwardly therefrom and a spring channel fixedly attached to the shank channel guard;
  a shank connected to the coupling arm at an end and extending downwardly therefrom to a tool-supporting end;
  a ground-engaging tool connected to the tool-supporting end of the shank; and
  a variable rate spring positioned in between the shank mount and the coupling arm and configured for providing a variable ground-engaging tool load, wherein the variable rate spring includes coils having a wider pitch and coils having a closer pitch, and wherein the coils having a wider pitch are positioned over a pivot casting of a spring retaining assembly;
wherein the spring channel has a first and second side wall and a middle portion interconnecting the first and second side walls, the middle portion having a protruding spring keeper section configured for contacting an end of the variable rate spring, the spring keeper section having a through-hole;
wherein the spring channel has a first and second side wall and a middle portion interconnecting the first and second side walls, the middle portion having a protruding spring keeper section configured for contacting an end of the variable rate spring, the spring keeper section having a through-hole; and the spring retaining assembly including the pivot casting pivotally connected to the shank mount and a retaining bolt extending through the through-hole of the spring keeper section of the spring channel and through a center axis of the variable rate spring, the retaining bolt being associated with the pivot casting.

2. The agricultural implement of claim 1, wherein the variable ground-engaging tool load increases in a hard soil.

3. The agricultural implement of claim 1, wherein the variable rate spring is in the form of a dual rate spring that has a first spring rate and a second spring rate.

4. The agricultural implement of claim 3, wherein the dual rate spring is configured to provide a first ground-engaging tool load associated with the first spring rate and a second ground-engaging tool load associated with the second spring rate.

5. The agricultural implement of claim 3, wherein the dual rate spring operates initially at the first spring rate and subsequently at the second spring rate.

6. The agricultural implement of claim 3, wherein the second spring rate is greater than the first spring rate.

7. The agricultural implement of claim 6, wherein the first spring rate is approximately 220 lbs./in and the second spring rate is approximately 260 lbs./in.

8. The agricultural implement of claim 1, wherein the first and second side wall are oriented at right angles relative to the middle portion of the spring channel, and are parallel relative to each other, and wherein the protruding keeper section of the middle portion of the spring channel is configured to protrude outward away from the variable rate spring.

9. The agricultural implement of claim 1, wherein the variable rate spring is only one spring.

10. The shank assembly of claim 1, wherein the variable rate spring is only one spring.

11. A shank assembly configured for engaging a soil, including:
   a shank mount;
   a coupling arm pivotally connected to the shank mount and extending rearwardly therefrom, the coupling arm including a shank channel guard pivotally connected to the shank mount and extending substantially horizontally and rearwardly therefrom and a spring channel fixedly attached to the shank channel guard;
   a shank connected to the coupling arm at an end and extending downwardly therefrom to a tool-supporting end;
   a ground-engaging tool connected to the tool-supporting end of the shank; and
   a variable rate spring positioned in between the shank mount and the coupling arm and configured for providing a variable ground-engaging tool load, wherein the variable rate spring includes coils having a wider pitch and coils having a closer pitch, and wherein the coils having a wider pitch are positioned over a pivot casting of a spring retaining assembly;
   wherein the spring channel has a first and second side wall and a middle portion interconnecting the first and second side walls, the middle portion having a protruding spring keeper section configured for contacting an end of the variable rate spring, the spring keeper section having a through-hole;
   wherein the spring channel has a first and second side wall and a middle portion interconnecting the first and second side walls, the middle portion having a protruding spring keeper section configured for contacting an end of the variable rate spring, the spring keeper section having a through-hole; and
   the spring retaining assembly including the pivot casting pivotally connected to the shank mount and a retaining bolt extending through the through-hole of the spring keeper section of the spring channel and through a center axis of the variable rate spring, the retaining bolt being associated with the pivot casting.

12. The shank assembly of claim 11, wherein the variable ground-engaging tool load increases in a hard soil.

13. The shank assembly of claim 11, wherein the variable rate spring is in the form of a dual rate spring that has a first spring rate and a second spring rate.

14. The shank assembly of claim 13, wherein the dual rate spring is configured to provide a first ground-engaging tool load associated with the first spring rate and a second ground-engaging tool load associated with the second spring rate.

15. The shank assembly of claim 13, wherein the dual rate spring operates initially at the first spring rate and subsequently at the second spring rate.

16. The shank assembly of claim 13, wherein the second spring rate is greater than the first spring rate.

17. The shank assembly of claim 16, wherein the first spring rate is approximately 220 lbs./in and the second spring rate is approximately 260 lbs./in.

18. The shank assembly of claim 11, wherein the first and second side wall are oriented at right angles relative to the middle portion of the spring channel, and are parallel relative to each other, and wherein the protruding, keeper section of the middle portion of the spring channel is configured to protrude outward away from the variable rate spring.

* * * * *